United States Patent Office 3,406,285
Patented Oct. 15, 1968

3,406,285
METHOD OF INSPECTION OF SOLDERED JOINTS COMPRISING USING A VOLATILE FLUORESCENT DYE
Donald G. Scorgie, Murrysville, and Bernard A. Kerns, Pittsburgh, Pa., assignors to Westinghouse Electric Corporation, Pittsburgh, Pa., a corporation of Pennsylvania
No Drawing. Filed Oct. 19, 1966, Ser. No. 587,656
6 Claims. (Cl. 250—71)

This invention relates to an inspection technique for determining if a satisfactory soldered joint, particularly in a complex electronic circuit, has been made.

A primary cause for poor reliability in soldered circuits is the missed or poorly soldered joint. The missed or cold solder joint usually occurs when an operator inadvertently omits or fails to perform the steps of soldering each joint with sufficient care to raise the temperature of the parts to be joined above the melting point of the solder and thus cause flow of solder at the joint. For a good soldered joint, the joint must reach at least the temperature of the molten solder so that the solder can wet and spread over the hot joint surfaces.

Although existing techniques may be used for the continuity checking of completely open circuits, such techniques seldom locate missed solder joints particularly in a printed circuit or electronic circuit with many soldered joints and are almost completely useless for locating cold solder joints where a drop of solder simply rests on a surface. The only known effective checking technique is a time consuming visual inspection whereby each joint is carefully inspected. Even so, some unsatisfactory joints remain undetected.

It has been found in accordance with this invention that the foregoing problems of determining pressed or cold colder joints may be overcome by preliminarily coating the electric components such as wires and terminals with a fluorescent dye indicator which upon heating during soldering to the satisfactory soldering temperature range will no longer fluoresce during a subsequent inspection. Contrarily, if a soldered joint is missed or not brought to a sufficient high temperature for adequate wetting and coating with melted solder at the joint, the fluorescent indicator will glow and be prominently evident during subsequent inspection.

Accordingly, it is an object of this invention to provide a method of inspection of soldered joints for readily detecting missed or cold solder joints and the like.

It is another object om this invention to provide a method of inspection of soldered joints by the precoating of joints, as between wires and terminals, to be soldered with a thermally sensitive fluorescent material which is resistant to flaking and mechanical abrasion and is not easily removed inadvertently.

Finally, it is an object of this invention to satisfy the foregoing objects and desiderata in a simple and effective manner.

Briefly, the method of inspection of soldered joints in members comprising the steps of (1) applying to the members a coating of a fluorescent material which fluorescent material is rendered non-fluorescing after heating to a predetermined soldering temperature, (2) soldering the joints of the members by heating them to a temperature as great as or greater than the temperature necessary to render the material non-fluorescent, and (3) inspecting the soldered components with an ultra-violet light or other radiation to locate any possible defective joints or areas which have not reached soldering temperature by observing a fluorescent glow thereat.

In accordance with the present invention it has been found that certain fluorescent dye materials may be used for readily locating missed or cold solder joints. Other compounds which glow under ultraviolet or other radiation frequencies, may be used if the compounds decompose or otherwise lose their glowing properties when heated to at least soldering temperatures so that the compound does not glow under such radiation when the joint is properly heated and thereby adequately soldered.

In particular, any fluorescent compound may be employed which loses its fluorescing properties if heated to or above temperatures of about 300° F. to 525° F. Particularly useful fluorescent compounds comprise organic substance capable of fluorescing and emitting visible light when exposed to radiations having wavelengths within 2500 A. and 4500 A., and preferably 3650 A. There are available numerous fluorescent dyes whose decomposition temperature or temperature at which the dye no longer will fluorescese is known. Some of the typical fluorescent organic substances which are suitable for the usual lead and lead tin solders, include the following:

Meta diethylaminophenol phthalein hydrochloride
Meta diethylaminophenol succin hydrochloride
Meta aminophenol phthalein hydrochloride
The ethyl ester of meta monobutylaminophenol phthalein
Meta aminophenol phthalein hydrochloride
Di (para dimethylaminophenyl) ketone imine hydrochloride
2,3, diphenyl N-phenyl quinox-alonium sulphate
p,p' di[p" (p'" aminobenzoyl-amino) benzoylamino] stilbene o,o'di[sodium sulphonate]
Meta mono-ethylaminophenol phthalein
Meta monoethylaminophenol phthalein ethylester hydrochloride
Diamino stilbene-di-sulphonic acid (sodium salt)
2, amino, 9(4' aminophenyl) acridonium nitrate
4, amino 1,8 naphthal p-xenyl-imide
2,[4' amino 8' carboxynaphthyl (1')] benzimidazole sodium sulfonate
Di(dimethylaminophenyl) phenylamino naphthyl methene chloride
4 methyl, 7 hydroxy coumarin sodium salt Many organic fluorescent materials suitable for practice of the invention are sold commercially either in powder or liquid form under trademarks, such as "Calcofluor" (by the American Cyanamid Company) or "Zyglo" (by the Zyglo Company). These may be purchased by specifying the temperature range or range of temperatures at which the fluorescent material will no longer fluoresce.

A coating composition of the fluorescent material is preferred by dissolving the material in a volatile organic solvent such as methyl alcohol, ethyl alcohol, and isopropyl alcohol to prepare a dilute solution. Other solvents may be used such as carbontetrachloride and trichloroethylene, and mixtures of two or more of such solvents with themselves or with alcohols, etc. Application and use of such a coating composition is satisfactory where the soldering operation follows immediately or within a sufficient time to permit the coating to dry.

A limitation of such fluorescent coatings however is that the dried coating of most fluorescent materials tends to flake readily off of the joint forming members, such as terminals or wire leads, to which it is applied particularly if handled or heated or otherwise disturbed. For that reason it is desirable to add a resinous binder or adhesive for retaining the coating of the fluorescent material in place after it is applied. Numerous resins may be employed, for example, polystyrene, polyester resins, and epoxy resins. A good binder or adhesive is a polyurethane resin. The resin in a solvent soluble, potentially reactive state is mixed with the fluorescent material and the solvent in suitable proportions. Polyurethane resins suitable for use in this invention are the reaction products of a polyisocyanate, such as toluene diisocyanate with a hydroxy group containing compound, such as a hydroxy polyester or hydroxy polyether or a hydroxy drying oil. A small amount of phenol may be reacted to produce a blocked polyurethane which upon heating will unblock and react to form a cross-linked polyurethane polymer. Polyurethane resins are commercially available which will react at room temperature when exposed to the air which usually brings moisture to the resin and causes a polymerizing reaction to take place. A binder or adhesive such as polyurethane resin enables the application of a coating at a time long previous to soldering. Polyurethane resin has an advantage of serving as a protective coating on wire leads against oxidation. Thus, assemblies of complicated circuits such as printed circuit boards may be coated in this manner and stored for extended periods of time prior to soldering with no deterioration due to oxidation.

A suitable composition for a coating is as follows, by weight:

|  | Range, percent | Preferred proportions, percent |
| --- | --- | --- |
| Fluorescent compound | 0.001–5 | 0.01–1.0 |
| Isopropyl alcohol |  | 75–85 |
| Polyurethane resin |  | 15–25 |

Other volatile organic solvents may replace a part or all of the isopropyl alcohol.

A maximum of only about 15 parts of polyurethane resin can be dissolved in 85 parts of isopropyl alcohol. To obtain a solution with higher percentages of polyurethane resin a good solvent for polyurethane resin, such as dimethylformamide, may be added to the alcohol, whereby higher percentages of polyurethane resin may be dissolved. This is shown in the following example:

|  | Percent |
| --- | --- |
| Polyurethane resin (curable at room temperature) | 25 |
| Isopropyl alcohol | 60 |
| Dimethyl formamide | 15 |
| Fluorescent compound | 0.01–1.0 |

The following example is illustrative of the present invention:

Example I

A mixture of a fluorescent coating material was prepared having 0.01% by weight 4 methyl, 7 hydroxy coumarin sodium salt, 85% by weight isopropyl alcohol, and 15% by weight of polyurethane resin. An assembly of terminals and wire leads was then coated with fluorescent material. The coating had a thickness of not greater than 0.001 inch. The precoated assembly was then allower to dry for up to ½ hour. The fluorescent coating did not flake off on handling before or during soldering. The coated terminals and leads were then soldered together by dipping in a molten solder bath using a 60–40 (Sn-Pb) solder having a melting point of about 348° F. After cooling the assembly was inspected under an ultraviolet light having a wavelength of 3660 A. to detect the presence of missed or cold soldered joints. It was found that such unsoldered or cold joints were readily identified by fluorescence at their areas whereas all properly heated and soldered joints showed no fluorescence.

Example II

A joint coated as in the preceding example, was heated by hand to a temperature of below 200° F. and a drop of molten solder applied thereto. The solder failed to wet the joint surfaces and in fact the surfaces never reached 348° F. so that the solder simply lay on the surface. Upon ultraviolet light being directed at the joint it fluoresced strongly in a blue-white glow indicating an unsatisfactory cold solder joint.

Where an assembly to be soldered is lightly to be subjected to unusual abrasion or vibration before soldering, a higher proportion of polyurethane resin may be added to make the coating more abrasion resistant and adherent.

The fluorescent composition indicator may be applied in a number of ways including brushing onto the terminals or leads. The brushing method, however, has the disadvantage of being messy because the fluid composition spreads over surrounding areas and parts. Preferred methods for applying the fluorescent dye indicator composition are: dipping the terminals in a shallow pan containing the fluorescent dye, or by application thereto of a felt which is wetted or saturated with the fluorescent indicator. When properly applied the fluorescent dye indicator is just visible under ordinary light as a thin clear coating and is slightly tacky to the touch until completely dry. It is preferred that the fluorescent coating have a thickness of up to 0.001 inch.

When viewed under ultraviolet light the coated terminals or components of the specific example above show up as a brilliant blue-white. After heating to the soldering temperatures however, the indicator decomposes and/or evaporates and all fluorescence disappears from the area of the actual soldered connection where the temperature is high enough to attain good soldering.

The fluorescent indicator may be selected so that it becomes non-fluorescing according to the melting point of the particular solder used. Thus, for conventional solder operation the solder melting point may vary from a temperature ranging from 325° F. to about 400° F. and the fluorescent material should become non-fluorescing at these temperatures. However, with printed circuit boards the soldering temperature may be as high as 525° F. and the fluorescent material selected should decompose or evaporate and no fluorescence occurs after heating to 525° F.

Finally, although the long wave ultraviolet light of 3660 A. is preferably used, the short wavelength 2537 A. may also be used. Other selected light frequencies may be adopted.

Accordingly, the method of the present invention permits the use of a fluorescent indicator for replacing a previously unsatisfactory inspection routine. The use of a solvent for the fluorescent material such as isopropyl alcohol is consistent with the use of alcohol for post soldering-cleaning operations, and the use of polyurethane resin protects the coated terminals or wires from being abraded prior to soldering.

It is understood that the above specification is merely exemplary and not in limitation of the invention.

What is claimed is:

1. A method of testing a soldered joint in a member comprising the steps of (1) applying a coating of a fluorescent dye to the joint to be soldered, the fluorescent dye being rendered non-fluorescing when heated to the soldering temperature, (2) heating the member at the joint to soldering temperature and applying solder thereto, and (3) inspecting the soldered joint with a light capable of causing the original fluorescent dye to fluoresce, whereby a defective soldered joint due to the temperatures not reaching the soldering temperature is indicated by fluorescence of the coating thereat.

2. The method of claim 1 in which the coating of fluorescent dye has a thickness of up to 0.001 inch.

3. The method of claim 1 in which the coating of the fluorescent dye comprises a volatile solvent for the dye, such solvent being a volatile organic compound.

4. The method of claim 1 in which the fluorescent dye coating also includes a resin.

5. The method of claim 4 wherein the resin is a polyurethane resin.

6. The method of claim 5 in which the coating also comprises a good solvent for polyurethane resin such as dimethyl formamide.

References Cited

UNITED STATES PATENTS

| | | | |
|---|---|---|---|
| 2,259,400 | 10/1941 | Switzer | 250—71 |
| 2,943,475 | 7/1960 | Benveniste et al. | 73—15 |
| 2,945,954 | 7/1960 | Gaugler | 250—71 |
| 3,139,360 | 6/1964 | Voida | 148—23 |

ARCHIE R. BORCHELT, *Primary Examiner.*